United States Patent [19]
Smith, II

[11] Patent Number: 6,088,864
[45] Date of Patent: Jul. 18, 2000

[54] APPARATUS AND METHOD FOR OPERATING A THEMATIC CAR WASH ASSEMBLY HAVING A NUMBER OF ANIMATED FIGURES ASSOCIATED THEREWITH

[75] Inventor: Kendall S. Smith, II, West Lafayette, Ind.

[73] Assignee: You Auto Have Fun, LLC, Lafayette, Ind.

[21] Appl. No.: 09/248,011

[22] Filed: Feb. 1, 1999

[51] Int. Cl.⁷ ........................................................ B60S 3/06
[52] U.S. Cl. ........................ 15/53.1; 15/DIG. 2; 15/53.3; 134/123
[58] Field of Search ..................................... 15/53.1, 53.2, 15/53.3, DIG. 2; 134/123

[56] References Cited

U.S. PATENT DOCUMENTS

| | | |
|---|---|---|
| D. 211,453 | 6/1968 | Adler . |
| D. 215,088 | 9/1969 | Baker . |
| 5,461,745 | 10/1995 | Nittoli . |
| 5,498,329 | 3/1996 | Lamminen et al. . |
| 5,613,260 | 3/1997 | Belanger et al. . |
| 5,685,778 | 11/1997 | Sheldon et al. . |
| 5,715,558 | 2/1998 | Johnson . |

OTHER PUBLICATIONS

Marketing brochure entitles, "SNF80™ Premium Hybrid Carwash System; The Soft'N Foamy System" printed by PECO Corporation, 150 Stephson Highway, Troy, Michigan 48083.

Marketing brochure entitled, "Maximize Your Cleaning Power; PECO Soft–Flex pe372 Wrap–Washer" printed by PECO Corporation, 1950 Stephenson Highway, Troy, Michigan 48083.

Copies of four color photographs showing an animated figure being displayed within a car wash.

*Primary Examiner*—Randall E. Chin
*Attorney, Agent, or Firm*—Maginot, Addison & Moore

[57] ABSTRACT

A car wash assembly includes a building and a conveyor which advances a vehicle along a vehicle path within the building. The car wash assembly also includes a washing system located within the building which is operable to wash the vehicle during advancement of the vehicle along the vehicle path. Moreover, the car wash assembly includes an animated figure having an actuated mode of operation during which the animated figure is operated in an active manner, and a non-actuated mode of operation during which the animated figure is passive. Yet further, the car wash assembly includes a detector for detecting presence of the vehicle and generating a control signal in response thereto. The animated figure is placed in the actuated mode of operation in response to generation of the control signal. A method for washing a vehicle within a building is also disclosed.

20 Claims, 12 Drawing Sheets

APPARATUS AND METHOD FOR OPERATING A THEMATIC CAR WASH ASSEMBLY HAVING A NUMBER OF ANIMATED FIGURES ASSOCIATED THEREWITH

TECHNICAL FIELD OF THE INVENTION

The present invention relates generally to a car wash assembly, and more particularly to an apparatus and method for operating a thematic car wash assembly having a number of animated figures associated therewith.

BACKGROUND OF THE INVENTION

Automatic vehicle washing assemblies, more commonly referred to as car washes, have become quite common. Such assemblies are designed to eliminate the need to manually scrub vehicles and to provide for the cleaning areas of a vehicle, such as the underbody, that are not easily and conveniently accessible during manual washing. There have been many improvements in car washing technology which have resulted in commercially available systems that are highly effective without damaging the vehicle exterior. In spite of the many advances in car wash technology, little has been done to improve the enjoyment of passengers within the vehicle while they are waiting for the car washing process to be completed.

The need for providing entertainment during utilitarian functions such as car washing has arisen due to the increased sophistication of children and adults through exposure to television, movies, amusement parks, and computers. This is particularly a concern for parents with smaller children who are too young to be left home alone while the parent performs various chores such as having the car washed. Unfortunately, they are often also too young and impatient to sit happily through the car washing procedure.

Accordingly, a need has developed for assemblies, systems, and methods for providing entertainment while performing such mundane chores as washing a car.

SUMMARY OF THE INVENTION

In accordance with a first embodiment of the present invention, there is provided a car wash assembly. The car wash assembly includes a building and a conveyor which advances a vehicle along a vehicle path within the building. The car wash assembly also includes a washing system located within the building which is operable to wash the vehicle during advancement of the vehicle along the vehicle path. Moreover, the car wash assembly includes an animated figure having an actuated mode of operation during which the animated figure is operated in an active manner, and a non-actuated mode of operation during which the animated figure is passive. Yet further, the car wash assembly includes a detector for detecting presence of the vehicle and generating a control signal in response thereto. The animated figure is placed in the actuated mode of operation in response to generation of the control signal.

In accordance with a second embodiment of the present invention, here is provided car wash assembly. The car wash assembly includes a building and a conveyor which advances a vehicle along a vehicle path within the building. The car wash assembly also includes a washing system located within the building which is operable to wash the vehicle during advancement of the vehicle along the vehicle path. Moreover, the car wash assembly includes an animated figure having an actuated mode of operation during which the animated figure is operated in an active manner, and a non-actuated mode of operation during which the animated figure is passive. The animated figure is in the actuated mode of operation when the vehicle is located within the building.

In accordance with a third embodiment of the present invention, there is provided a method of washing a vehicle within a building. The method includes the step of advancing a vehicle along a vehicle path within the building. The method also includes the step of washing the vehicle during advancement of the vehicle in the vehicle path. Yet further, the method includes the step of detecting presence of the vehicle during advancement of the vehicle in the vehicle path and generating a control signal in response thereto. In addition, the method includes the step of operating an animated figure in an active manner within the building in response to generation of the control signal.

In accordance with a fourth embodiment of the present invention, there is provided a method of washing a vehicle within a building. The method includes the step of advancing a vehicle along a vehicle path within the building. Moreover, the method includes the step of washing the vehicle during advancement of the vehicle in the vehicle path. In addition, the method includes the step of operating an animated figure in an active manner within the building when the vehicle is located within the building.

It is therefore an object of the present invention to provide a new and useful car wash assembly.

It is also an object of the present invention to provide an improved car wash assembly.

It is further an object of the present invention to provide a new and useful method of washing a vehicle within a building.

It is moreover an object of the present invention to provide an improved method of washing a vehicle within a building.

Yet further, it is an object of the present invention to provide a car wash assembly having a entertaining theme.

The above and other objects, features, and advantages of the present invention will become apparent from the following description and the attached drawings.

DETAILED DESCRIPTION OF THE INVENTION

Figure 1:
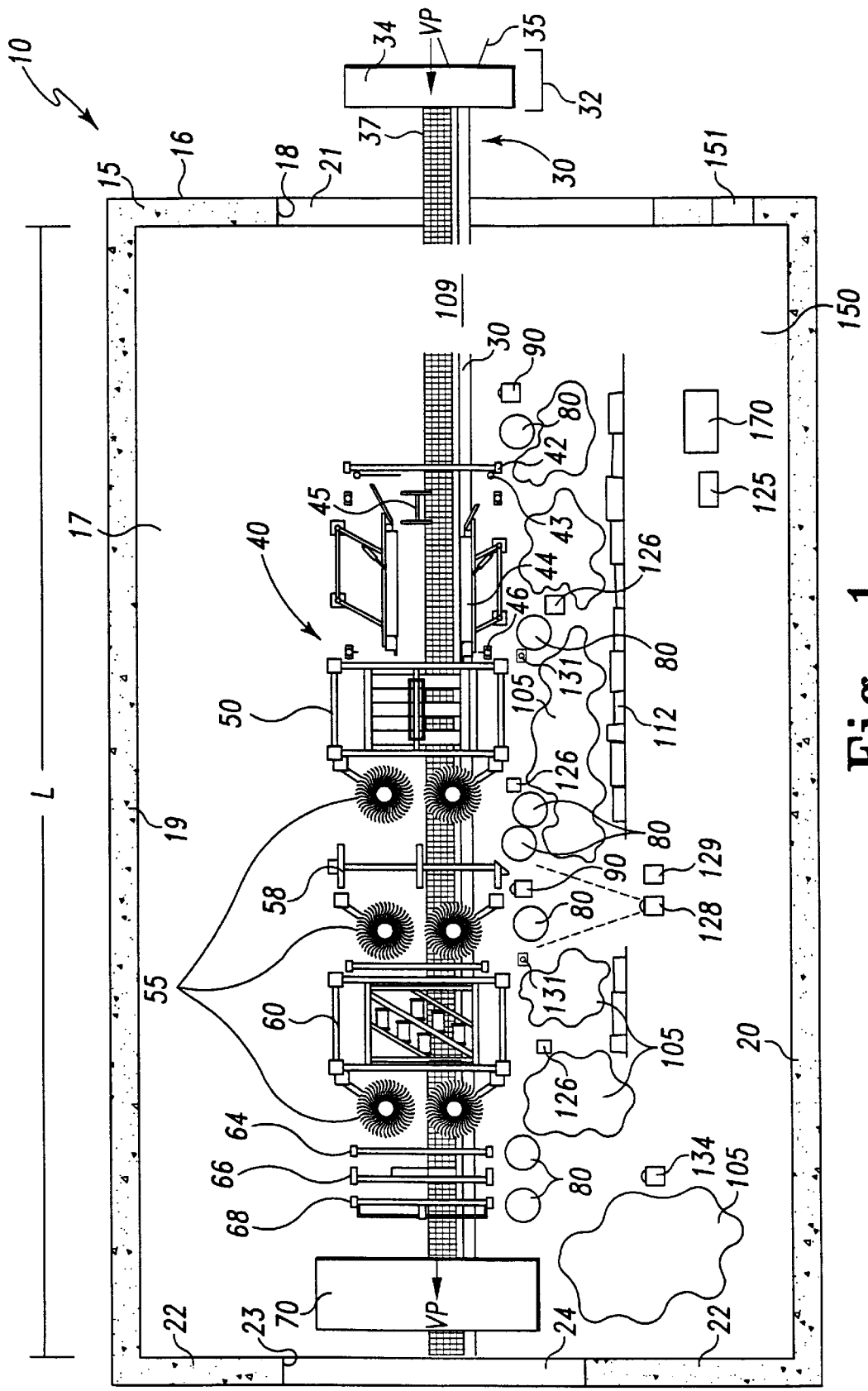
FIG. 1 is a top elevational view of a car wash assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

The present invention provides devices, assemblies, and methods for performing utilitarian functions in an entertaining manner. The assemblies include a washing system for cleaning a vehicle in a constructed environment that is designed to give the appearance of a thematic location. In a particular embodiment, the environment is configured to resemble a rainforest which cooperates with the inherent rainforest effect of an automated car washing system.

Figure 2:
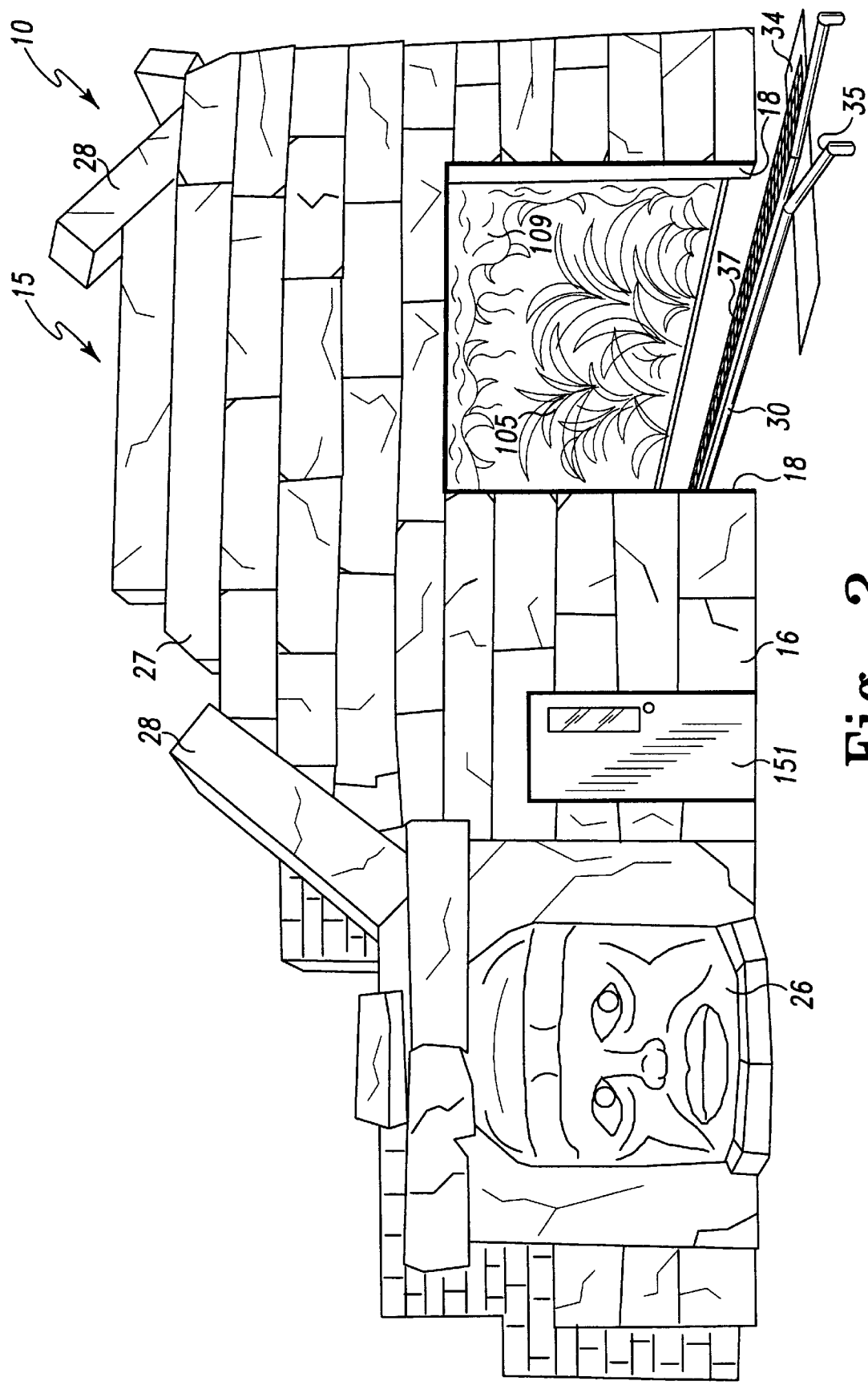
FIG. 2 is a front elevational view of the car wash assembly of FIG. 1.

Referring now to FIGS. 1 and 2, there is shown a car wash assembly 10 which includes a building 15 having an elongated tunnel shaped interior 17. The building 15 includes a front wall 16 and an entrance 18. Preferably, the building 15 includes a barrier 21 for temporarily blocking the opening or entryway 18 when the car wash assembly 10 is not in use. The building 15 also includes sidewalls 19 and 20 which enclose the interior 17 of the building 15. The building 15 also includes a rear wall 22 having an exit 23 defined therein. Preferably, the building 15 includes an exit barrier 24 for closing off the exit 23 to control the atmosphere within the interior 17 of the building 15. Numerous types of barriers are contemplated for use as the barriers 21, 24 of the present invention. For example, the barriers 21, 24 may include a pneumatic door.

The exterior of the building 15 includes a facade which keeps with the theme of the car wash assembly 10. For example, in a preferred embodiment, the theme of the car wash assembly is that of a rainforest. Hence, FIG. 2 shows an external animated FIG. 26 such as a large talking stone face 26 that suggests the rainforest theme. The talking stone face 26 is configured to perform an animation sequence of lifelike facial movements to entertain and attract customers to the car wash assembly 10. The facade shown in FIG. 2 further includes large stones or bricks 27, including slanted stones 28.

The car wash assembly 10 also includes a conveyor 30 that advances a vehicle along a vehicle path VP defined through the interior tunnel 17 and along the length L of the building 15. The conveyor 30 extends from outside the building 15 through the entrance 18 to the exit 23 of the building 15. The conveyor 30 preferably includes a correlator 32 for lining up the vehicle along the vehicle path VP. The correlator 32 includes a slide plate 34 and a funnel 35 for lining up the vehicle wheels correctly on the conveyor 30. The slide plate 34 floats the tires of a vehicle to be washed into alignment with the conveyor 30. The car wash assembly 10 also includes an elongated drain 37 defined along the length L of the building 15 and parallel to the conveyor 30.

The car wash assembly 10 also includes a washing system 40 located within the building 15 which is operable to wash and wax the vehicle during advancement of the vehicle along the vehicle path VP. The washing system 40 is preferably a soft cloth and high pressure car washing system which is commercially available from Peco Car Washing Systems, 1950 Stephenson Highway, Troy, Mich., 48083. The car washing system 40 applies various chemical agents to the vehicle during advancement of the vehicle along the vehicle path VP. Such chemical agents may include various cleansing agents, tire whitener applicators, waxes, and other suitable agents. As described in more detail below, the washing system 40 also includes a number of washing members which are positioned to contact the vehicle during advancement of the vehicle along the vehicle path VP.

As shown in FIG. 1, the car washing system 40 includes a presoak arch 42 for loosening dirt and film on the vehicle. Moreover, the washing system 40 also includes features such as a super white applicator 43 for applying tire cleaning solution, a tire brush system 44, and an underbody flush applicator 45. After the vehicle advances past the tire brush system 44, a cleansing agent is applied to the vehicle by use of a low volume foaming unit 46. The washing system 40 also includes one or more high pressure arches 58 for delivering water under pressure to further clean the vehicle. The washing system 40 also includes a vehicle rise archway 64, and a number of applicators for applying other products, such as a sealer wax applicator 66, and a drying agent applicator 68. The final step in a vehicle washing procedure is the drying step in which the vehicle travels along the conveyor 30 underneath a dryer system 70 and out through the exit 23.

Figure 3:
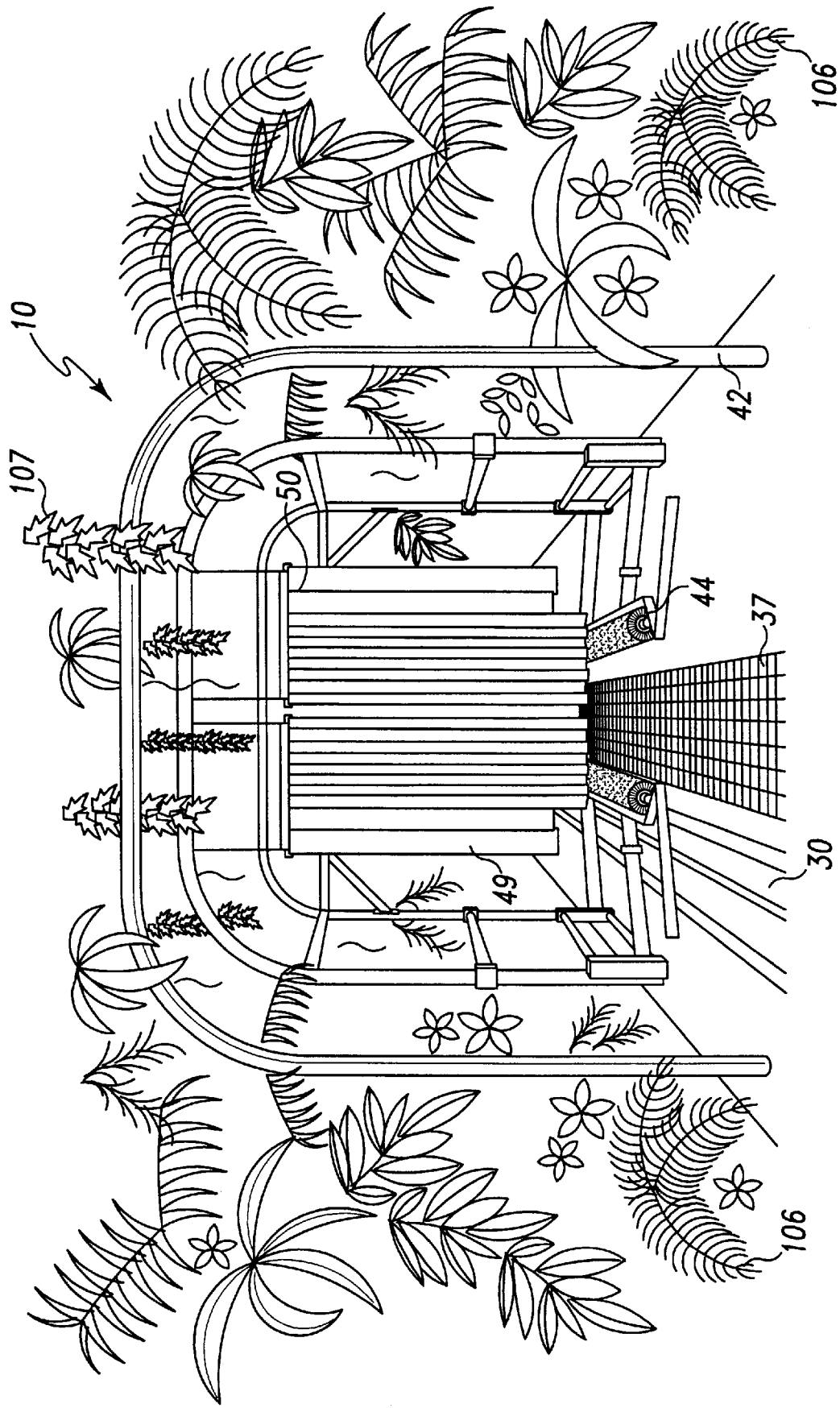
FIG. 3 is a front elevational view of a portion of the car wash assembly of FIG. 1.
Figure 4:
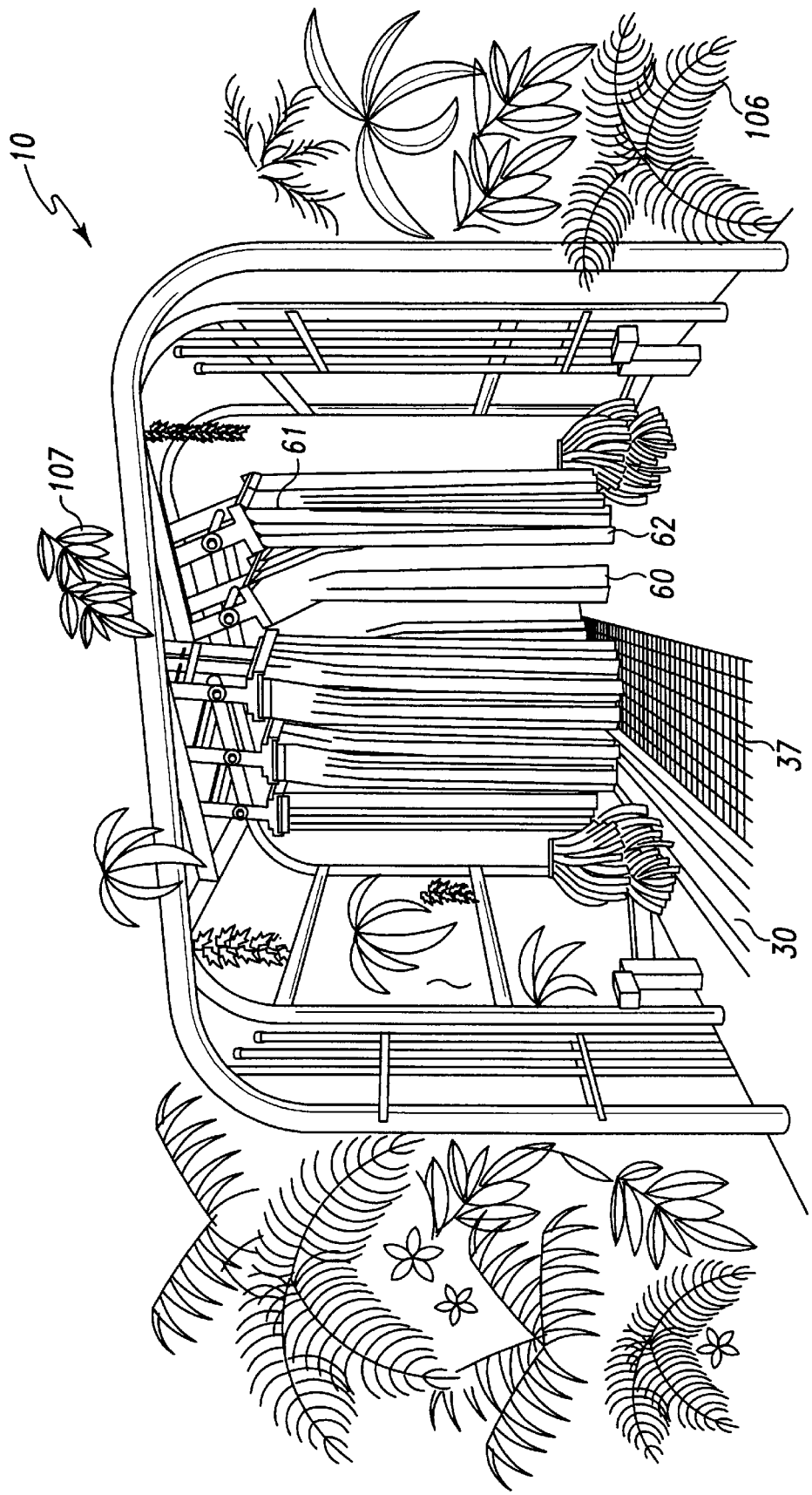
FIG. 4 is a front elevational view of another portion of the car wash assembly of FIG. 1.

As alluded to above, the washing system 40 includes a number of washing members 49 which are preferably elongated strips of soft washing cloth or the like. As shown in FIG. 3, the washing members 49 are arranged so as to form a mitting curtain 50. Preferably, the mitting curtain 50 is urged so as to oscillate or otherwise move back and forth as the vehicle travels along the conveyor 30. The washing system 40 also preferably includes a number of side washers 55, each of which carries elongated soft washing members. Preferably, the washing system 40 also includes an additional mitting curtain 60, as shown in FIG. 4. The second mitting curtain 60 includes sets 61 of washing members 62. Each set 61 is oscillated or otherwise moved in a diagonal direction relative to the vehicle path VP. Preferably, the features of the washing system 40 are configured to appear in accordance with the theme of the car wash assembly 10.

For example, in the case of a rainforest theme, each of the washing members 49, 62 are green in color.

The car wash assembly 10 further includes a number of mechanically animated Figure 80 disposed within the tunnel 17 adjacent the vehicle path VP and in view of a passenger within the vehicle as the vehicle is conveyed along the vehicle path VP. Each of the animated Figure 80 is preferably shaped and colored to resemble a creature which keeps with the theme of the car wash assembly 10. For example, in the case of the rainforest theme, the animated Figure 80 are configured to resemble living beings such as a monkey, elephant, gorilla, jaguar, tropical bird, alligator, orangutan, iguana, or a snake. Representations of the various animated Figure 80 are shown in FIGS. 5–14. The various animated Figure 80 are selectively positioned in predetermined locations along the vehicle path VP as shown in FIG. 1. Each of the animated Figure 80 is configured to perform an animation sequence of lifelike movements that simulate a living animal. In particular, each animated Figure 80 is operable in an actuated mode of operation in which the animated Figure 80 is operated in an active manner. What is meant herein by the term "active manner" is the operation of an animated figure such that the animated figure performs an animation sequence of lifelike movements. It should be appreciated that each of the animated Figure 80 is mechanically coupled to a motor or the like for moving the animated Figure 80 in a pattern of movement or animation sequence when the animated Figure 80 is operated in an active manner.

Figure 5:
FIG. 5 is a side elevational view of an animated figure of the car wash assembly of FIG. 1 which is configured to resemble an alligator.
Figure 6:
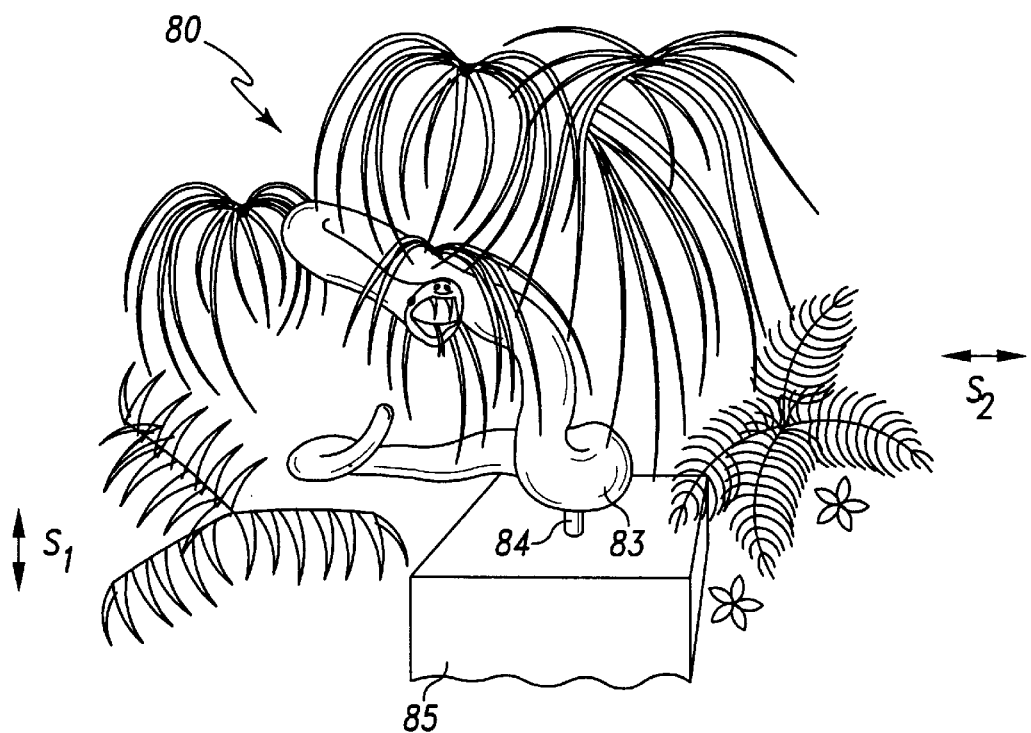
FIG. 6 is a front elevational view of an animated figure of the car wash assembly of FIG. 1 which is configured to resemble a snake.
Figure 7:
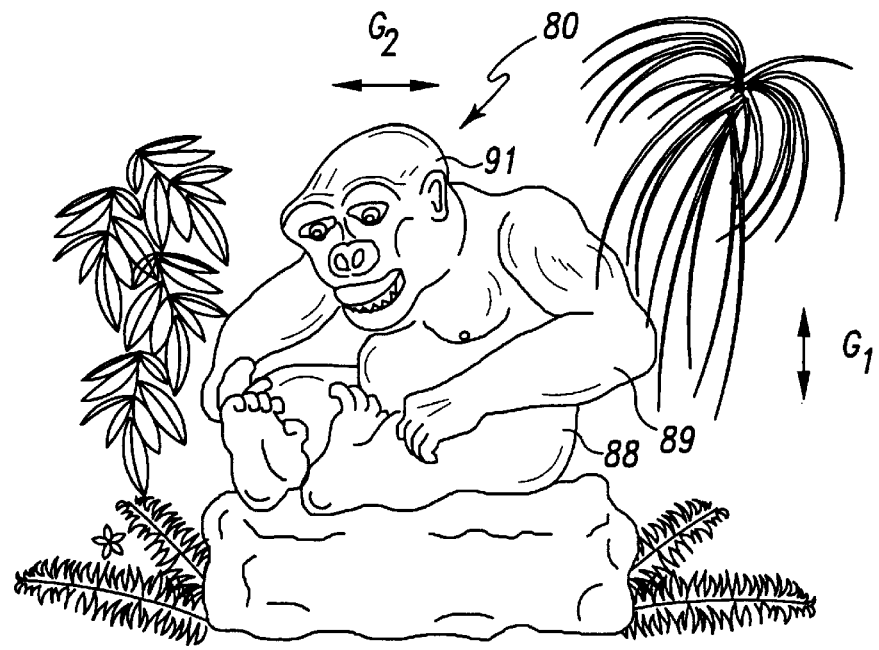
FIG. 7 is front elevational view of an animated figure of the car wash assembly of FIG. 1 which is configured to resemble a baby gorilla.

Examples of operation of the animated Figure 80 in an active manner include movements of major body parts such that the movements can be easily seen by a passenger in the vehicle as the vehicle is conveyed along the vehicle path VP. For example, FIG. 5 shows an animated Figure 81 shaped to resemble an alligator which is supported by a support member 82. The support member 82 oscillates or otherwise moves between two points so that the alligator 81 appears to move forward and backward in the general direction of arrow $A_1$. Moreover, the alligator's mouth is also designed to open and shut in the general direction of arrow $A_2$ of FIG. 5 such that it appears that the alligator 81 is snapping at passengers within the vehicle when the alligator is operated in an active manner. Another example of operation of an animated Figure 80 in an active manner is shown in FIG. 6 which shows a snake 83 that is supported by a support member 84 coupled to a platform 85. The snake 83 is configured to move vertically in the general direction of arrow $S_1$ or horizontally in the general direction of arrow S2 or in more complicated rotational movements (not shown) when the snake is operated in an active manner. Referring now to FIG. 7, a gorilla 88 includes arms 89 that can be raised and lowered in a vertical direction (as indicated by arrow $G_1$) when the gorilla 88 is operated in an active manner. The gorilla's head 91 can also be raised and lowered in the general direction of arrow $G_1$, as well as horizontally (as indicated by arrow $G_2$) when the gorilla is operated in an active manner.

Figure 8:
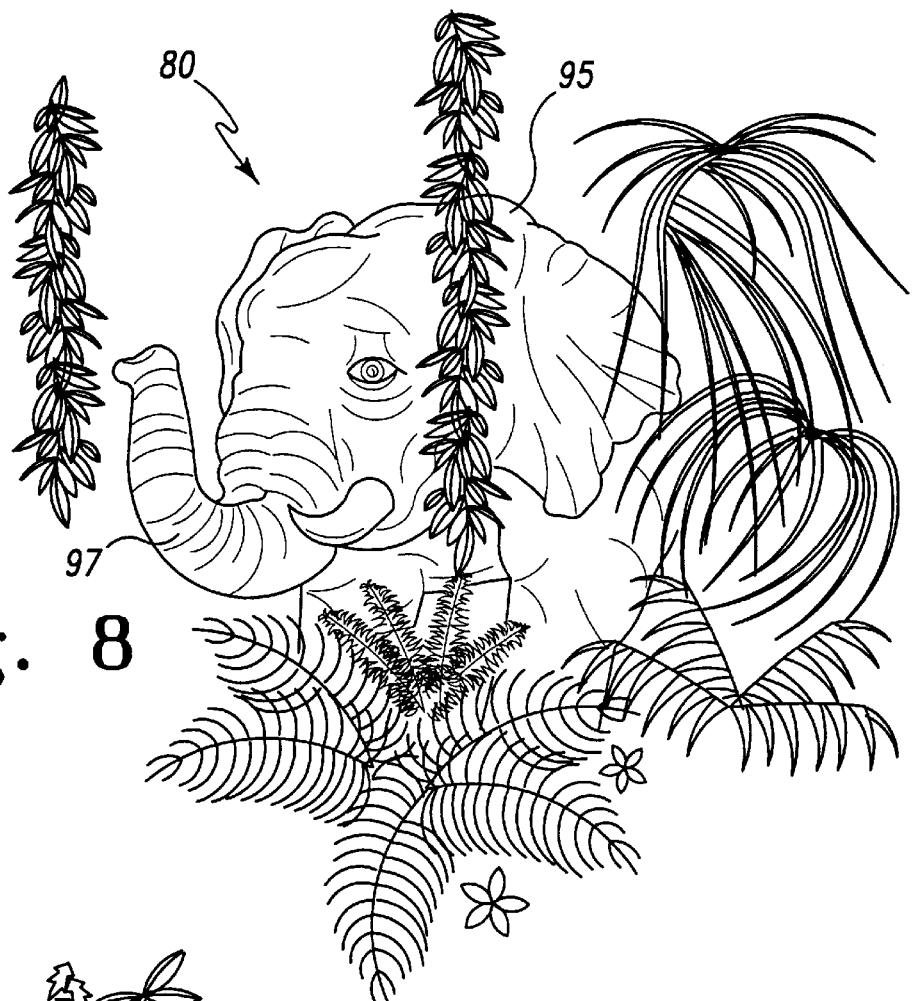
FIG. 8 is a front elevational view of an animated figure of the car wash assembly of FIG. 1 which is configured to resemble an elephant, with the animated figure shown in its non-actuated mode of operation.
Figure 9:
FIG. 9 is a view similar to FIG. 8, but showing the animated figure being operated in its actuated mode of operation.
Figure 11:
FIG. 11 is a front elevational view of an animated figure of the car wash assembly of FIG. 1 which is configured to resemble a tropical bird.
Figure 13:
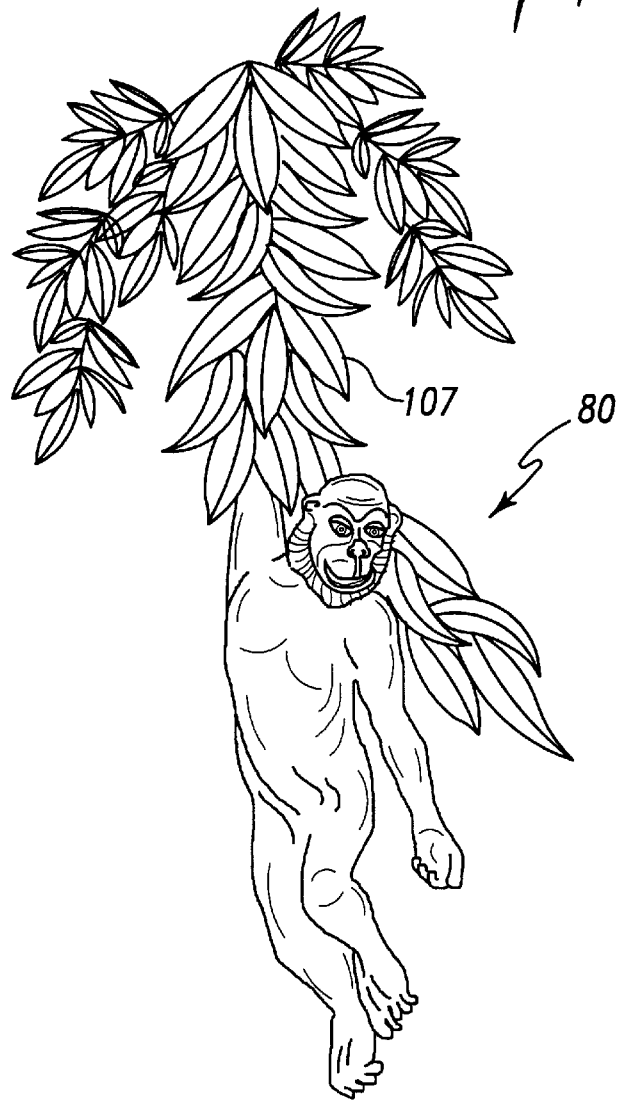
FIG. 13 is a front elevational view of an animated figure of the car wash assembly of FIG. 1 which is configured to resemble a monkey.
Figure 14:
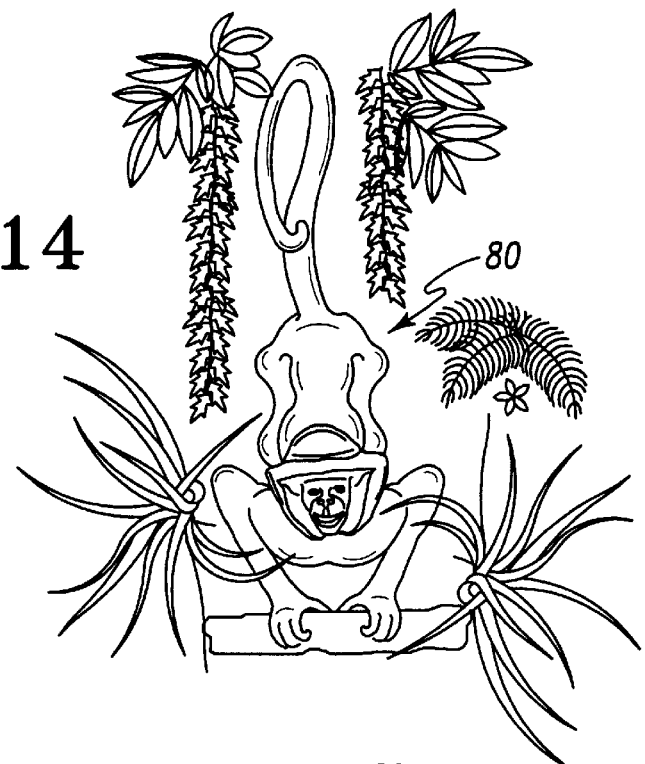
FIG. 14 is a front elevational view of an animated figure of the car wash assembly of FIG. 1 which is configured to resemble a monkey.
Figure 12:
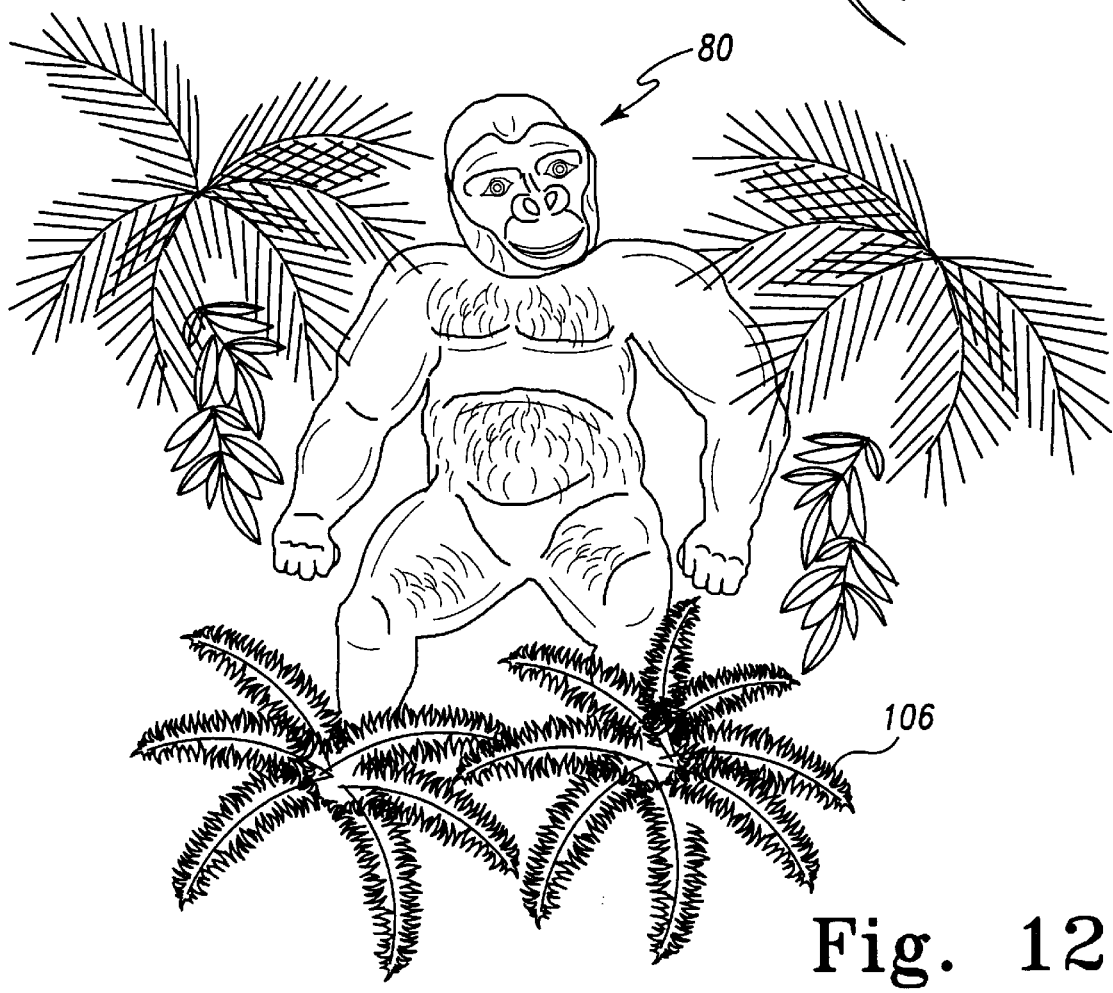
FIG. 12 is a front elevational view of an animated figure of the car wash assembly of FIG. 1 which is configured to resemble a gorilla.

As shown in Figure 8 and 9, an animated figure shaped to resemble an elephant 95 is configured to perform various animation sequences along with certain other functions when the elephant is operated in an active manner. In particular, the elephant 95 includes a hollow trunk 97 having a liquid spray nozzle 98 disposed within the hollow portion of the trunk 97. As the elephant 95 raises its head, water is sprayed through the liquid spray nozzle 98 and out through a fluid exit 99 such that the elephant 95 sprays water on the vehicle advancing along the vehicle path VP when the elephant is operated in an active manner.

Moreover, each of the animated Figure 80 may be operated in a non-actuated mode of operation during which the animated Figure 80 is passive. What is meant herein by the term "passive" in regard to operation of an animated figure is that the animated figure is at rest or otherwise stationary.

Figure 10:
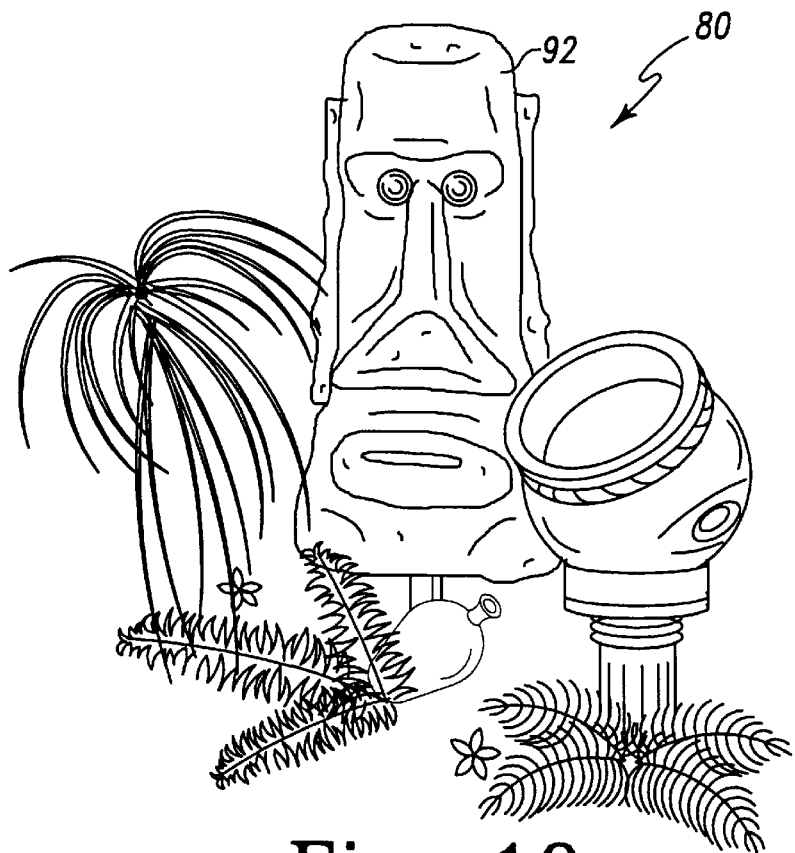
FIG. 10 is a front elevational view of a carved creature of the car wash assembly of FIG. 1.

The tunnel 17 is also provided with various props positioned along the vehicle path VP at selected locations that enhance a given theme (e.g. a rainforest theme). The animated Figure 80, scenery, props, and special effects devices of this invention are all constructed to withstand the wet conditions of a vehicle washing assembly. Suitable animated figures and props are available from Mechanical Displays, Inc., 4420 Farragut Road, Brooklyn, N.Y., 11203. For example, a religious item 92 that might be found in a rainforest is shown in FIG. 10. This and similar items can be inactive to contribute to the intended atmosphere or may also be animated. A representation of vegetation 105 which is of the type found an a natural rainforest is provided as shown in FIGS. 1 and 2. Various structures resembling ferns 106 (see FIG. 12) and vines 107 (see FIG. 13), for example, can be used to camouflage the mechanical equipment used to operate the animated Figure 80. Various types of vegetation 105 are also used to camouflage the car washing equipment and contribute to the overall theme as shown in FIGS. 2–4. The invention contemplates any suitable structures that contribute to the theme, such as structures that resemble vegetation including vines, leaves, plants, flowers, and trees.

As shown in FIG. 2, the car wash assembly 10 includes a canopy 109. The canopy 109 further contributes to the overall theme and camouflages overhead equipment. Preferably, lights associated with a light system 130 are provided to shine though the canopy 109 to simulate light shining though the natural canopy of a rainforest.

Various other props can also be used to contribute to the various themes of this invention. For example, as shown in FIG. 1, the car wash assembly 10 includes a simulated stone wall 112. The stone wall 112 contributes to the overall theme and also serves to further hide equipment located within a mechanical area 150 associated with the building 15.

The car wash assembly 10 also includes an audio system 125 that generates sounds that relate to the theme of the car wash assembly 10. For example, the audio system 125 simulates sounds produced by a living being preferably corresponding to a particular animated Figure 80 when the Figure 80 is operated in its actuated mode of operation. The audio system 125 includes various speakers 126 some of which are located proximate to a particular animated Figure 80 for producing the sounds corresponding to the particular animated Figure 80. In addition to animal sounds, the speakers 126 may produce sounds simulating wind, thunder, moving vegetation, and cracking wood sounds. In particular to the rainforest theme, a thunder speaker 129 is provided proximate to a lightning box 128 which is designed to simulate lightning within the tunnel 17. The lightning box 128 is part of the light system 130 which also includes other lights 131 placed along the vehicle path VP as well as the overhead canopy light.

The invention also contemplates any other suitable special effect devices for contributing to the overall intended atmosphere of the rainforest or other theme. Such special effects devices are well known in the art. For example, the invention contemplates a fog generator 134 that an generate fog, steam, mist, or the like.

The car wash assembly 10 also includes a control system 160 which is provided to control operation of the animated Figure 80, the props, and the special effects devices (e.g. the lightning box 128, the audio system 125, and the fog generator 134) associated with the car wash assembly 10. Numerous components associated with the control system 160 are preferably housed within a cabinet 170 (see FIG. 16) which is located in the mechanical area 150 of the building 15. As shown in Figure 1 and 2, the mechanical area 150 can be accessed through an exterior door 151 thereby allowing personnel to enter the mechanical area 150 of the building 15 without having to walk through the washing area.

Figure 15:
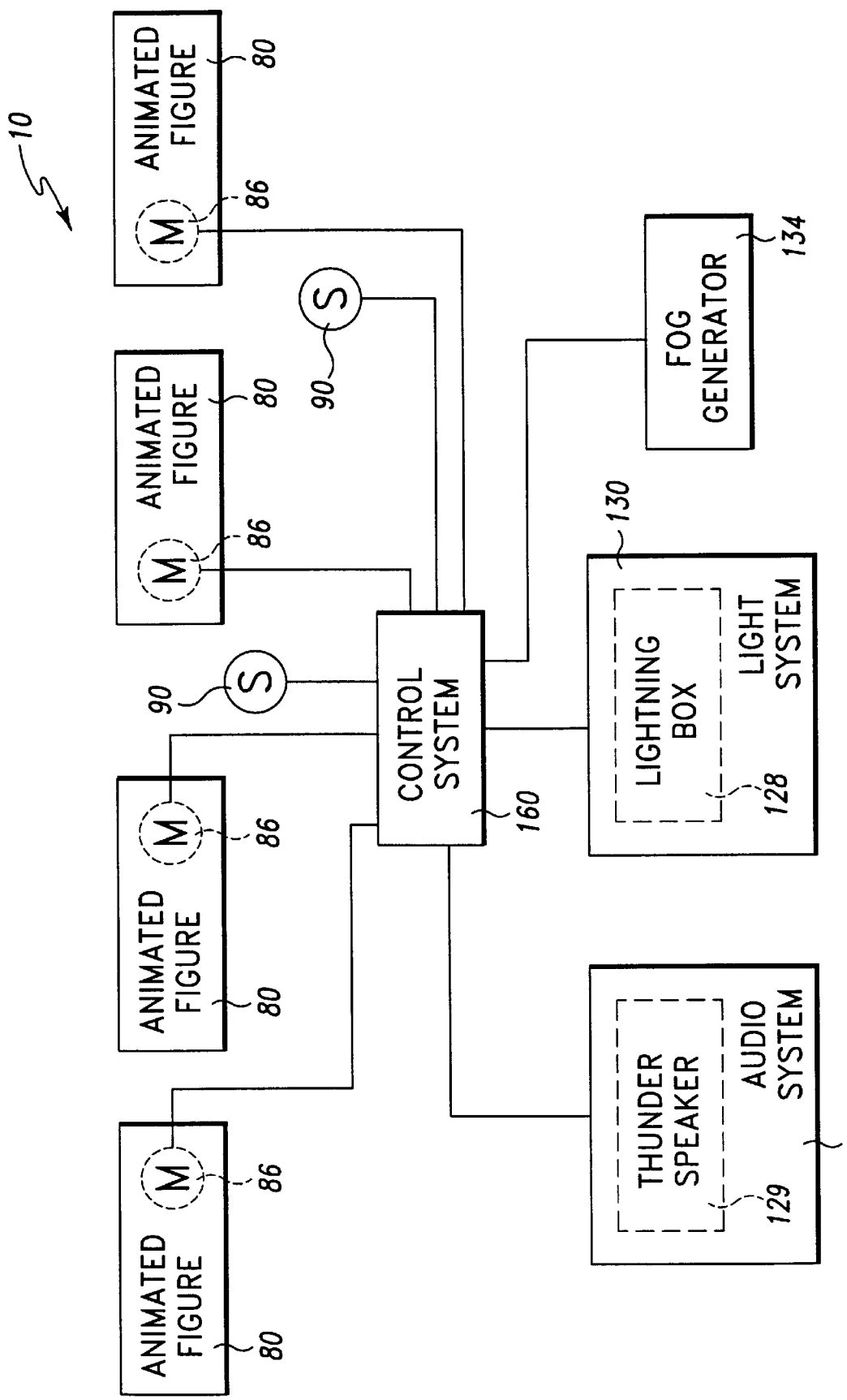
FIG. 15 is a simplified block diagram of the car wash assembly of FIG. 1.

As shown in FIG. 15, each of the animated Figure 80 is electrically coupled to the control system 160. In particular, as alluded to above, each of the animated figures includes a number of electric motors 86 each of which is electrically coupled to the control system 160 via a number of control and power lines. When power is applied to a given electric motor or motors 86 associated with a given animated Figure 80 so as to operate the motor or motors 86 in an on-state of operation, the animated Figure 80 is operated in its respective actuated mode of operation. In particular, the motors 86, when excited, provide the motive power for moving the mechanical components associated with the given animated Figure 80 thereby causing the animated Figure 80 to perform its animation sequence. For example, excitation of one of the motors 86 causes the alligator 81 to snap its jaws open and shut (see FIG. 5). Similarly, excitation of another one of the motors 86 may cause the snake 83 (see FIG. 6) to be moved back and forth or up and down. It should be appreciated that the control system 160 may also operate other components associated with the animated Figure 80 such as a water pump in a similar manner. For example, actuation of a water pump by the control system 160 may cause the elephant 95 (see FIG. 9) to spray water from its trunk 97 in the manner discussed above.

In addition, a number of the other components associated with the car wash assembly 10 are also electrically coupled to the control system 160. In particular, the audio system 125 and each of the speakers 126 associated therewith (e.g. the thunder speaker 129) are electrically coupled to the control system 160. Moreover, the light system 130, including the lights 131 and the lightning box 128, is electrically coupled to the control system 160. In addition, other props or special effects devices such as the fog generator 134 are also electrically coupled to the control system 160. Moreover, it should be appreciated that the washing system 40 may be electrically coupled to the control system 160 or preferably may be under the control of a separate, dedicated control system (not shown).

Figure 16:
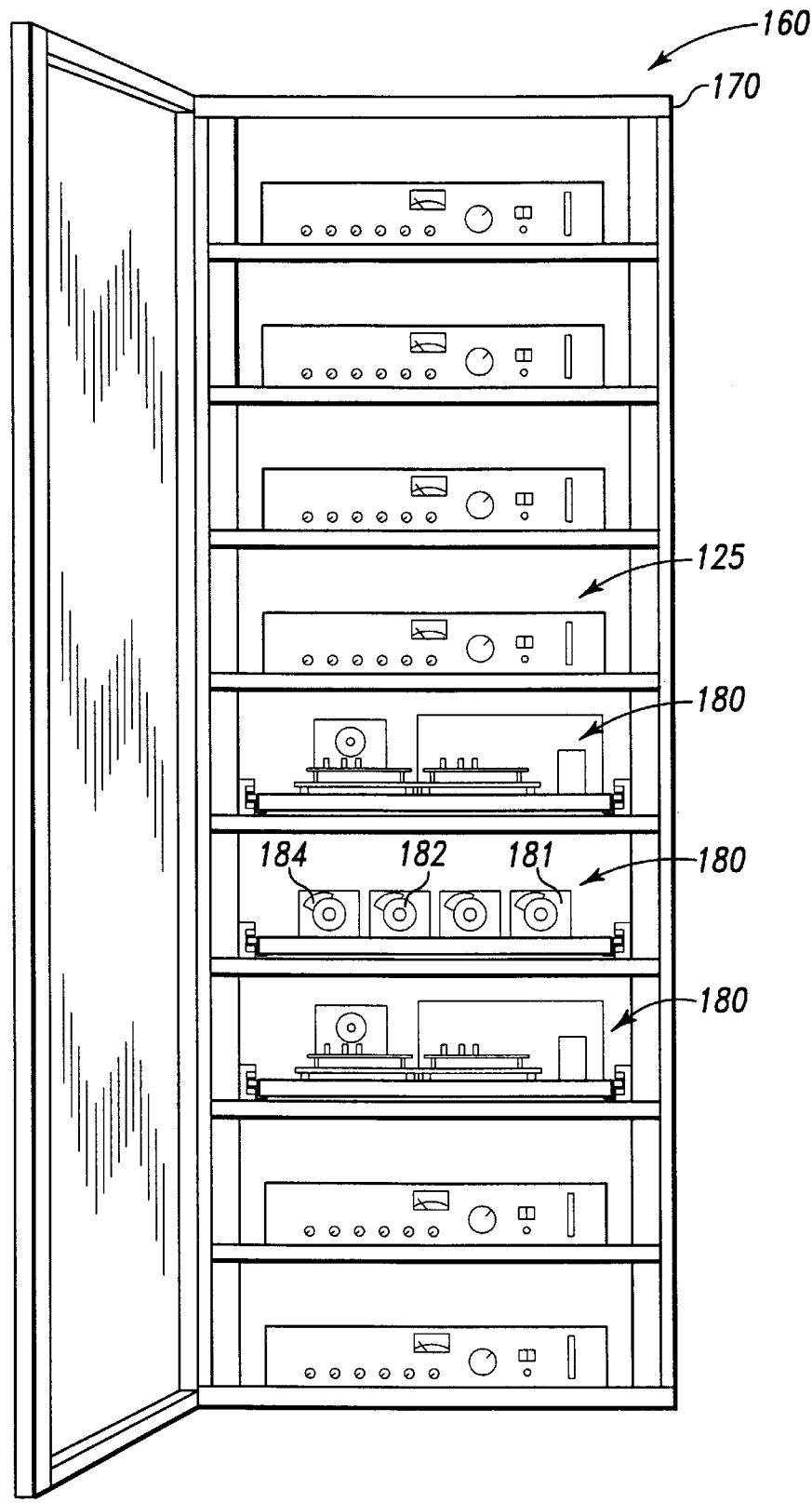
FIG. 16 is a front elevational view of the control cabinet of the car wash assembly of FIG. 1.
Figure 17:
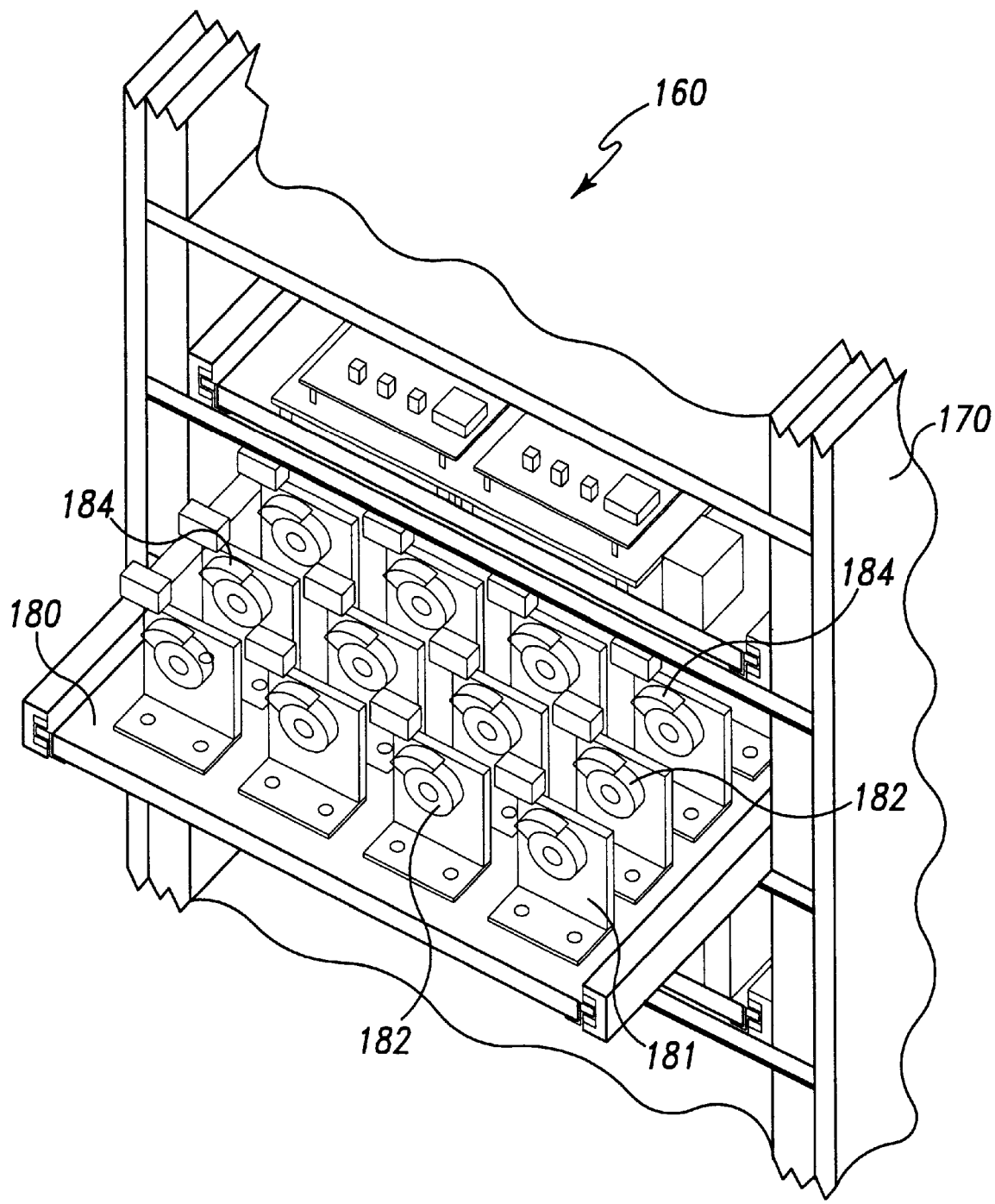
FIG. 17 is a front prospective view of a portion of the control cabinet of FIG. 16 which shows the switching assembly in greater detail.

The control system 160 is configured to operate the animated Figure 80, props, and special effects devices (e.g. the lightning box 128, the audio system 125, and the fog generator 134) in a number of different manners. For example, as shown in FIGS. 16 and 17, control system 160 includes a switching assembly 180 which has a number of cam actuated switches 181 associated therewith. Each cam actuated switch 181 corresponds to an animated figure, prop, or special effect device so as to cause actuation thereof. In particular, each of the cam actuated switches 181 includes a rotating cam disk 182 and a cam follower 184. The cam follower 184 follows a cam profile defined in the rotating cam disk 182 so as to be selectively lifted and dropped at predetermined points in time during rotation of the rotating cam disk 182. Such selective lifting and dropping of the cam follower causes selective making and breaking of an electrical switch thereby providing a switching function for certain components associated with the car wash assembly 10. For example, one of the cam actuated switches 181 may be coupled to one of the motors 86 associated with an animated Figure 80 thereby selectively switching the motor 86 between its on-state of operation and its off-state of operation which in turn selectively causes the animated Figure 80 associated with the motor 86 to be selectively switched between its actuated mode of operation and its non-actuated mode of operation. Moreover, one of the cam actuated switches 181 may be electrically coupled to a prop or special effect device (e.g. a light associated with the light system 130) such that the prop or special effect device is selectively actuated and deactuated at predetermined points in time by the cam actuated switch 181.

It should be appreciated that use of the cam actuated switches 181 allows for actuation and deactuation of the animated Figure 80, props, or special effects devices coupled thereto irrespective of vehicle location within the building 15. In particular, once the control system 160 is activated, the rotating cam disks 182 associated with each of the cam switches 181 begins to rotate and hence commences switching. Hence, the animated Figure 80, props, or special effects devices coupled to the cam actuated switches 181 begin to be operated irrespective of presence of a vehicle within the building 15. However, the car washing system 40 also has a number of detector or sensors 90 for detecting the presence of the vehicle at certain locations along the vehicle path VP. Each of the sensors 90 is electrically coupled to the control system 160 by a signal line as shown in FIG. 15. It should be appreciated that the sensors 90 may be any type of sensor such as a pressure switch, a photodetector, or other type of proximity switch which generates an output signal which is sent to the control system 160 when the sensor 90 detects presence of the vehicle at a predetermined location within the building 15. For example, each of the sensors 90 may be embodied as a pressure switch which is actuated by the weight of a vehicle so as to generate an output signal which is sent to the control system 160 when the vehicle's tires roll onto the switch.

The output of each of the sensors 90 may be utilized to selectively actuate and deactuate one of the animated Figure 80, props, or special effects devices. In particular, in response to generation of a vehicle detected control signal from one of the sensors 90, the control system 160 may cause one of the animated Figure 80, props, or special effects devices proximate to the detected vehicle to be actuated. For example, in response to generation of a vehicle detected control signal, the control system 160 may cause the elephant 95 (see FIG. 9) to be operated in its actuated mode of operation thereby causing the elephant 95 to spray water on the detected vehicle from its trunk 97. Moreover, in response to generation of a vehicle detected control signal, the control system 160 may cause the lightning box 128 to generate simulated lightning which flashes near the detected vehicle and thereafter cause the audio system 125 to generate the associated simulated thunder on the thunder speaker 129. Moreover, in response to generation of a vehicle detected control signal, the control system 160 may cause the fog generator 134 to generate fog which engulfs or otherwise spreads over the detected vehicle. It should be appreciated that the various animated Figure 80, props, and special effects devices may also be deactuated when the sensors 90 produce an output signal (or lack thereof which is indicative of the vehicle no longer being positioned proximate to the sensor 90.

Hence, it should be appreciated that the various animated Figure 80, props, and special effects devices associated with the car wash assembly 10 may be operated via timer control (i.e. via the cam actuated switches 181 associated with the switching assembly 180) or via vehicle detection control (i.e. actuated and deactuated in response to generation of output signals from the sensors 90). It should be readily apparent to one skilled in the art that the allocation of which components are operated via timer control and which components are operated via vehicle detection control is configurable to meet the needs of a given car wash assembly 10.

In operation, a vehicle to be washed is advanced to the entrance 18 of the building 15 such that the vehicle may be aligned with the conveyor 30 by the correlator 32. Once aligned, the vehicle is advanced along a vehicle path VP by the conveyor 30 from the entrance 18 to the exit 23 of the building 15. As the vehicle is being advanced along the vehicle path VP, the car washing system 40 washes the vehicle as described above. Moreover, during advancement of the vehicle through the building 15, the animated Figure 80, the props, and the special effects devices are operated so as to provide a thematic experience for the passengers of the vehicle such as the experience of being present in a rainforest. As described above, certain of the animated Figure 80, props, and special effects devices may be operated via timer control (i.e. via the cam actuated switches 181 associated with the switching assembly 180), whereas other animated Figure 80, props, and special effects devices may be operated via vehicle detection control (i.e. actuated and deactuated in response to generation of output signals from the sensors 90). Once the car wash procedure is completed, the vehicle is allowed to exit through the exit 23 thereby completing the vehicle passenger's thematic experience.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, although the control system 160 is herein described as being an electromechanical assembly of cam actuated switches, sensors, and the like, and has significant advantages thereby in the present invention, certain of such advantages may be achieved by use of other types of control systems. For example, operation of each of the animated Figure 80, the props, and the special effects devices may controlled via a PC-based control system which selectively actuates and deactuates the components associated with the car wash assembly 10.

Moreover, although numerous components associated with the car wash assembly 10 (e.g. the animated Figure 80, the special effects devices such as the fog generator 134, the props, the simulated vegetation 105, and the simulated stone wall 112) are shown located on only one side of the conveyor 30 in FIG. 1 for clarity of description, it should be appreciated that such components are preferably located on both sides of the conveyor 30. For example, a simulated stone wall 112 and a number of the animated Figure 80 are preferably located on both sides of the conveyor 30.

There are a plurality of advantages of the present invention arising from the various features of the car wash assembly described herein. It will be noted that alternative embodiments of the car wash assembly of the present invention may not include all of the features described yet still benefit from at least some of the advantages of such features. Those of ordinary skill in the art may readily devise their own implementations of a car wash assembly that incorporate one or more of the features of the present invention and fall within the spirit and scope of the present invention as defined by the appended claims.

What is claimed is:

1. A car wash assembly, comprising:

a building;

a conveyor which advances a vehicle along a vehicle path within said building;

a washing system located within said building which is operable to wash said vehicle during advancement of said vehicle along said vehicle path;

an animated figure having (i) an actuated mode of operation during which said animated figure is operated in an active manner, and (ii) a non-actuated mode of operation during which said animated figure is passive; and a detector for detecting presence of said vehicle and generating a control signal in response thereto, wherein said animated figure is placed in said actuated mode of operation in response to generation of said control signal.

2. The car wash assembly of claim 1, further comprising a motor which is mechanically coupled to said animated figure, wherein:

said motor is operable to move said animated figure in a pattern of movement when said animated figure is in said actuated mode of operation.

3. The car wash assembly of claim 1, wherein:

said animated figure is configured to resemble an elephant, and said animated figure is further configured to direct a stream of liquid toward said vehicle while said animated figure is operated in said active manner.

4. The car wash assembly of claim 1, further comprising:

a light system for generating light which simulates lightning in response to generation of said control signal; and an audio system for generating sound which simulates thunder in response to generation of said control signal.

5. The car wash assembly of claim 1, wherein said washing system is operable to apply a cleansing agent onto said vehicle during advancement of said vehicle along said vehicle path.

6. The car wash assembly of claim 5, wherein:

said washing system includes a number of washing members, and said washing members are positioned to contact said vehicle (i) during advancement of said vehicle along said vehicle path, and (ii) after said cleansing agent is applied to said vehicle.

7. The car wash assembly of claim 1, wherein:

when said animated figure is operated in said active manner, said animated figure is manipulated in a sequence of movements which simulates movement of a living being.

8. The car wash assembly of claim 7, wherein:

said animated figure is configured to resemble a living being selected from the group which includes a monkey, an elephant, a jaguar, a gorilla, a bird, an alligator, an orangutan, an iguana, and a snake.

9. The car wash assembly of claim 8, further comprising:

an audio system for generating sound which simulates sound produced by said living being when said animated figure is operated in said active manner.

10. A car wash assembly, comprising:

a building;

a conveyor which advances a vehicle along a vehicle path within said building;

a washing system located within said building which is operable to wash said vehicle during advancement of said vehicle along said vehicle path; and an animated figure having (i) an actuated mode of operation during which said animated figure is operated in an active manner, and (ii) a non-actuated mode of operation during which said animated figure is passive, wherein said animated figure is in said actuated mode of operation when said vehicle is located within said building.

11. The car wash assembly of claim 10, further comprising a motor which is mechanically coupled to said animated figure for moving said animated figure in a pattern of movement when said animated figure is in said actuated mode of operation.

12. The car wash assembly of claim 11, further comprising a cam actuated switching mechanism for causing said motor to be placed in an on-state of operation during a first time period, and an off-state of operation during a second time period, wherein:

said animated figure is in said actuated mode of operation when said motor is in said on-state of operation, and said animated figure is in said non-actuated mode of operation when said motor is in said off-state of operation.

13. The car wash assembly of claim 11, wherein said animated figure is moved in said pattern of movement while said animated figure is in said actuated mode of operation.

14. The car wash assembly of claim 10, wherein:

said animated figure is configured to resemble an elephant, and said animated figure is further configured to direct a stream of liquid toward said vehicle while said animated figure is operated in said active manner.

15. The car wash assembly of claim 10, further comprising:

a detector for detecting presence of said vehicle and generating a control signal in response thereto;

a light system for generating light which simulates lightning in response to generation of said control signal; and an audio system for generating sound which simulates thunder in response to generation of said control signal.

16. The car wash assembly of claim 10, wherein said washing system is operable to apply a cleansing agent onto said vehicle during advancement of said vehicle along said vehicle path.

17. The car wash assembly of claim 16, wherein:

said washing system includes a number of washing members, and said washing members are positioned to contact said vehicle (i) during advancement of said vehicle along said vehicle path, and (ii) after said cleansing agent is applied to said vehicle.

18. The car wash assembly of claim 10, wherein:

when said animated figure is operated in said active manner, said animated figure is manipulated in a sequence of movements which simulates movement of a living being.

19. The car wash assembly of claim 18, wherein:

said animated figure is configured to resemble a living being selected from the group which includes a monkey, an elephant, a jaguar, a gorilla, a bird, an alligator, an orangutan, an iguana, and a snake.

20. The car wash assembly of claim 19, further comprising:

an audio system for generating sound which simulates sound produced by said living being when said animated figure is operated in said active manner.

* * * * *